US012325978B2

(12) United States Patent
Kumagai et al.

(10) Patent No.: US 12,325,978 B2
(45) Date of Patent: Jun. 10, 2025

(54) WORK MACHINE

(71) Applicant: Hitachi Construction Machinery Co., Ltd., Tokyo (JP)

(72) Inventors: Kento Kumagai, Ami-Machi (JP); Shinya Imura, Toride (JP); Yasutaka Tsuruga, Ryugasaki (JP); Takaaki Chiba, Kasumigaura (JP); Shinjirou Yamamoto, Ami-Machi (JP); Hiroaki Amano, Tsukuba (JP); Shinji Nishikawa, Kasumigaura (JP); Akihiro Narazaki, Tsukuba (JP)

(73) Assignee: Hitachi Construction Machinery Co., Ltd, Tokyo (JP)

( * ) Notice: Subject to any disclaimer, the term of this patent is extended or adjusted under 35 U.S.C. 154(b) by 0 days.

(21) Appl. No.: 18/683,384

(22) PCT Filed: Oct. 31, 2022

(86) PCT No.: PCT/JP2022/040751
§ 371 (c)(1),
(2) Date: Feb. 13, 2024

(87) PCT Pub. No.: WO2023/139885
PCT Pub. Date: Jul. 27, 2023

(65) Prior Publication Data

US 2024/0344297 A1 Oct. 17, 2024

(30) Foreign Application Priority Data

Jan. 21, 2022 (JP) ................................ 2022-008207

(51) Int. Cl.
*E02F 9/22* (2006.01)
*F15B 11/00* (2006.01)
(Continued)

(52) U.S. Cl.
CPC .............. *E02F 9/2235* (2013.01); *E02F 9/22* (2013.01); *E02F 9/2203* (2013.01);
(Continued)

(58) Field of Classification Search
CPC ......... E02F 9/2235; E02F 9/22; E02F 9/2203; E02F 9/2228; E02F 9/2292; E02F 9/2296;
(Continued)

(56) References Cited

U.S. PATENT DOCUMENTS 5,829,252 A * 11/1998 Hirata .................. E02F 9/2242 60/429
7,614,336 B2 11/2009 VerKuilen et al.
(Continued)

FOREIGN PATENT DOCUMENTS

JP 3511425 B2 3/2004
JP 5214450 B2 6/2013
(Continued)

OTHER PUBLICATIONS

International Search Report (PCT/ISA/210) issued in PCT Application No. PCT/JP2022/040751 dated Dec. 20, 2022 with partial English translation (5 pages).
(Continued)

*Primary Examiner* — Dustin T Nguyen
(74) *Attorney, Agent, or Firm* — Crowell & Moring LLP

(57) ABSTRACT

The present invention intends to provide a work machine that can execute speed control of an actuator and torque control of a swing motor by a simple configuration at the time of combined operation to simultaneously drive the swing motor and the other actuator. For this purpose, a controller calculates a pump target flow rate on the basis of an actuator target flow rate and a swing target flow rate and calculates a target meter-in opening area of an actuator directional control valve on the basis of the actuator target
(Continued)

flow rate, a pump pressure, and an actuator meter-in pressure. The controller calculates target torque of the swing motor on the basis of the input amount of operation devices and output values of posture sensors and calculates a swing target meter-out pressure on the basis of the target torque and a swing meter-in pressure. The controller calculates a target meter-out opening area of a swing directional control valve on the basis of the swing target meter-out pressure and a swing meter-out pressure.

2 Claims, 11 Drawing Sheets

(51) Int. Cl.

| | |
|---|---|
| ***F15B 11/02*** | (2006.01) |
| ***F15B 11/028*** | (2006.01) |
| ***F15B 11/042*** | (2006.01) |
| ***F15B 11/044*** | (2006.01) |
| ***F15B 11/16*** | (2006.01) |
| ***F15B 21/08*** | (2006.01) |

(52) U.S. Cl.
CPC .......... *E02F 9/2228* (2013.01); *E02F 9/2292* (2013.01); *E02F 9/2296* (2013.01); *F15B 11/00* (2013.01); *F15B 11/02* (2013.01); *F15B 11/028* (2013.01); *F15B 11/042* (2013.01); *F15B 11/044* (2013.01); *F15B 11/16* (2013.01); *F15B 21/087* (2013.01)

(58) Field of Classification Search
CPC ......... F15B 11/00; F15B 11/02; F15B 11/028; F15B 11/042; F15B 11/044; F15B 11/16; F15B 21/087
See application file for complete search history.

(56) References Cited

U.S. PATENT DOCUMENTS

| | | | | |
|---|---|---|---|---|
| 8,818,649 B2 * | 8/2014 | Udagawa | ................ | H02P 29/10 37/379 |
| 8,919,115 B2 * | 12/2014 | Hagiwara | ............. | E02F 9/2292 60/426 |
| 9,284,717 B2 * | 3/2016 | Umeda | ................... | B66C 23/86 |
| 10,006,473 B2 * | 6/2018 | Nishikawa | .............. | E02F 9/123 |
| 10,995,474 B2 * | 5/2021 | Takahashi | ............. | E02F 9/2235 |
| 12,180,682 B2 * | 12/2024 | Nakajima | ............. | F15B 11/044 |
| 2016/0312440 A1 | 10/2016 | Izumi et al. | | |
| 2017/0183842 A1 | 6/2017 | Yamashita et al. | | |

FOREIGN PATENT DOCUMENTS

| | | |
|---|---|---|
| JP | 2017-116075 A | 6/2017 |
| JP | 2021-88896 A | 6/2021 |
| WO | WO 2015/092933 A1 | 6/2015 |

OTHER PUBLICATIONS

Japanese-language Written Opinion (PCT/ISA/237) issued in PCT Application No. PCT/JP2022/040751 dated Dec. 20, 2022 with English translation (7 pages).

International Preliminary Report on Patentability (PCT/IB338 & PCT/IB/338 & PCT/IB/373) issued in PCT Application No. PCT/JP2022/040751 dated Aug. 2, 2024, including English translation of Written Opinion (PCT/ISA/237) (6 pages).

* cited by examiner

WORK MACHINE

TECHNICAL FIELD

The present invention relates to a work machine such as a hydraulic excavator.

BACKGROUND ART

In general, work machines such as hydraulic excavators are equipped with various hydraulic actuators. As a control circuit for executing fluid feed/discharge control for such hydraulic actuators, conventionally, there has been widely known a control circuit that is configured to execute, by one spool valve, directional control to execute switching between the feed and discharge directions of a hydraulic operating fluid with respect to the hydraulic actuator, meter-in opening control to control the flow rate of supply from a hydraulic pump to the hydraulic actuator, and meter-out opening control to control the flow rate of discharge from the hydraulic actuator to a hydraulic operating fluid tank.

In the case of executing the meter-in opening control and the meter-out opening control by one spool valve as above, the relationship between the opening area of the meter-in side and the opening area of the meter-out side with respect to the movement position of the spool valve is uniquely determined.

Therefore, it is impossible to change the relationship between the opening area of the meter-in side and the opening area of the meter-out side according to the contents of various kinds of work of single operation in which one hydraulic actuator is solely driven and combined operation in which a plurality of hydraulic actuators are simultaneously driven, or light work, heavy work, and the like. Thus, there is a possibility that one opening control interferes with the other opening control to lowers the operability when the flow rate of supply to an actuator is controlled by the meter-in opening control or the flow rate of discharge from an actuator is controlled by the meter-out opening control.

Thus, conventionally, there has been known a control circuit that executes fluid feed/discharge control for hydraulic actuators by a bridge circuit formed with use of four metering valves, that is, head-side and rod-side supply valves (head-end and rod-end supply valves) that control the flow rate of supply from a hydraulic pump to a head-side hydraulic chamber and a rod-side hydraulic chamber of a hydraulic cylinder, respectively, and head-side and rod-side discharge valves (head-end and rod-end drain valves) that control the flow rate of discharge from the head-side hydraulic chamber and the rod-side hydraulic chamber, respectively, to a hydraulic tank (for example, Patent Document 1).

In the control circuit of Patent Document 1, the four metering valves are individually actuated on the basis of a command from a controller. Thus, it is possible to easily change the relationship between the meter-in opening and the meter-out opening according to the contents of work and so forth.

Furthermore, there has also been known a control circuit in which an auxiliary valve having a variable resistance function is disposed on the upstream side of a directional control valve that executes the above-described directional control, meter-in opening control, and meter-out opening control by one spool valve, and hydraulic fluid supply to the directional control valve is executed in an auxiliary manner by the auxiliary valve according to the contents of work of single operation, combined operation, or the like, and so forth (for example, Patent Document 2).

PRIOR ART DOCUMENT

Patent Documents

Patent Document 1: Japanese Patent NO. 5214450
Patent Document 2: Japanese Patent NO. 3511425

SUMMARY OF THE INVENTION

Problem to be Solved by the Invention

However, in the control circuit of Patent Document 1, the fluid feed/discharge control for the hydraulic actuators is executed by the four metering valves. Thus, there is a problem in which, in addition to four spools (or poppets) configuring each of the four metering valves, four actuators (in Patent Document 1, solenoids) for driving the respective spools are necessary and the cost increases due to increase in the complexity of the circuit and increase in the number of parts.

Meanwhile, in the control circuit of Patent Document 2, although distribution of a hydraulic fluid to the respective hydraulic actuators and the degree of priority to them at the time of combined work can be controlled by the auxiliary valve, the meter-in opening control and the meter-in opening control for the hydraulic actuators are executed by the one directional control valve as usual. Thus, the problem in which one opening control interferes with the other opening control still remains unsolved.

The present invention is made in view of the above-described problem and an object thereof is to provide a work machine that can execute speed control of an actuator and torque control of a swing motor by a simple configuration at the time of combined operation to simultaneously drive the actuator and the swing motor.

Means for Solving the Problem

In order to achieve the above-described object, the present invention provides the following work machine. The work machine includes a track structure, a swing structure swingably attached onto the track structure, a work device attached to the swing structure, a hydraulic operating fluid tank, a hydraulic pump of a variable displacement type that sucks in a hydraulic operating fluid from the hydraulic operating fluid tank and delivers the hydraulic operating fluid, a regulator that controls the capacity of the hydraulic pump, an actuator that drives the work device, and a swing motor that drives the swing structure. The work machine includes also an actuator directional control valve that controls the flow of a hydraulic fluid supplied from the hydraulic pump to the actuator, a swing directional control valve that controls the flow of the hydraulic fluid supplied from the hydraulic pump to the swing motor, operation devices to make an instruction of operation of the actuator and the swing motor, and a controller that controls the regulator, the actuator directional control valve, and the swing directional control valve according to the input amount of the operation devices. This work machine includes a first pressure sensor that senses a pump pressure that is a delivery pressure of the hydraulic pump, second pressure sensors that sense an actuator meter-in pressure that is a pressure on a meter-in side of the actuator, third pressure sensors that sense a swing meter-in pressure that is a pressure on a meter-in side of the swing motor and a swing meter-out pressure that is a pressure on a meter-out side of the swing motor, and posture sensors that sense the posture of the swing structure and the work device. A meter-in opening and a meter-out opening are formed of the same valve disc in each of the actuator directional control valve and the swing directional control valve. The actuator directional control valve is formed in such a manner that the meter-in opening becomes smaller than the meter-out opening with respect to valve displacement. The swing directional control valve is formed in such a manner that the meter-out opening becomes smaller than the meter-in opening with respect to valve displacement. The controller is configured to calculate an actuator target flow rate that is a target value of the flow rate of the hydraulic fluid supplied from the hydraulic pump to the actuator on the basis of the input amount of the operation devices and calculate a swing target flow rate that is a target value of the flow rate of the hydraulic fluid supplied from the hydraulic pump to the swing motor on the basis of the input amount of the operation devices. The controller is configured to calculate a pump target flow rate that is a target value of the delivery flow rate of the hydraulic pump on the basis of the actuator target flow rate and the swing target flow rate and calculate a target meter-in opening area that is a target value of the meter-in opening area of the actuator directional control valve on the basis of the actuator target flow rate, the pump pressure, and the actuator meter-in pressure. The controller is configured to calculate target torque that is a target value of input torque to the swing motor on the basis of the input amount of the operation devices and output values of the posture sensors and calculate a swing target meter-out pressure that is a target of the swing meter-out pressure on the basis of the target torque and the swing meter-in pressure. The controller is configured to calculate a target meter-out opening area that is a target value of the meter-out opening area of the swing directional control valve on the basis of the swing target meter-out pressure and the swing meter-out pressure and control the regulator according to the pump target flow rate, The controller is configured to control the actuator directional control valve according to the target meter-in opening area and control the swing directional control valve according to the target meter-out opening area.

According to the present invention configured as above, at the time of combined operation to simultaneously drive the swing motor and another actuator, the boom can be operated in accordance with the target speed by regulating the meter-in opening according to the differential pressure across the boom directional control valve, and supplying the boom cylinder with the same flow rate as the target. Furthermore, an overrun of the swing structure due to the inertia, and so forth, can be prevented by regulating the meter-out opening of the swing directional control valve and inputting the same torque as the target to the swing motor. Moreover, the pump target flow rate of the hydraulic pump is the sum of the boom target flow rate and the swing target flow rate, and the flow rate obtained by subtracting, from the delivery flow rate of the hydraulic pump, the flow rate of supply to the boom cylinder is supplied to the swing motor. Thus, the swing structure can be operated in accordance with the target speed. Due to this, with the simple configuration using the directional control valves that execute the meter-in opening control and the meter-out opening control by the same valve disc, speed control of the actuator and torque control of the swing motor can be executed at the time of combined operation to simultaneously drive the swing motor and the other actuator.

Advantages of the Invention

According to the work machine according to the present invention, it becomes possible to execute speed control of an actuator and torque control of a swing motor by a simple configuration at the time of combined operation to simultaneously drive the swing motor and the other actuator.

MODES FOR CARRYING OUT THE INVENTION

Description will be made below with reference to the drawings by taking as an example a hydraulic excavator as a work machine according to an embodiment of the present invention. In the respective diagrams, an equivalent element is given the same numeral and overlapping description is omitted as appropriate.

Figure 1:
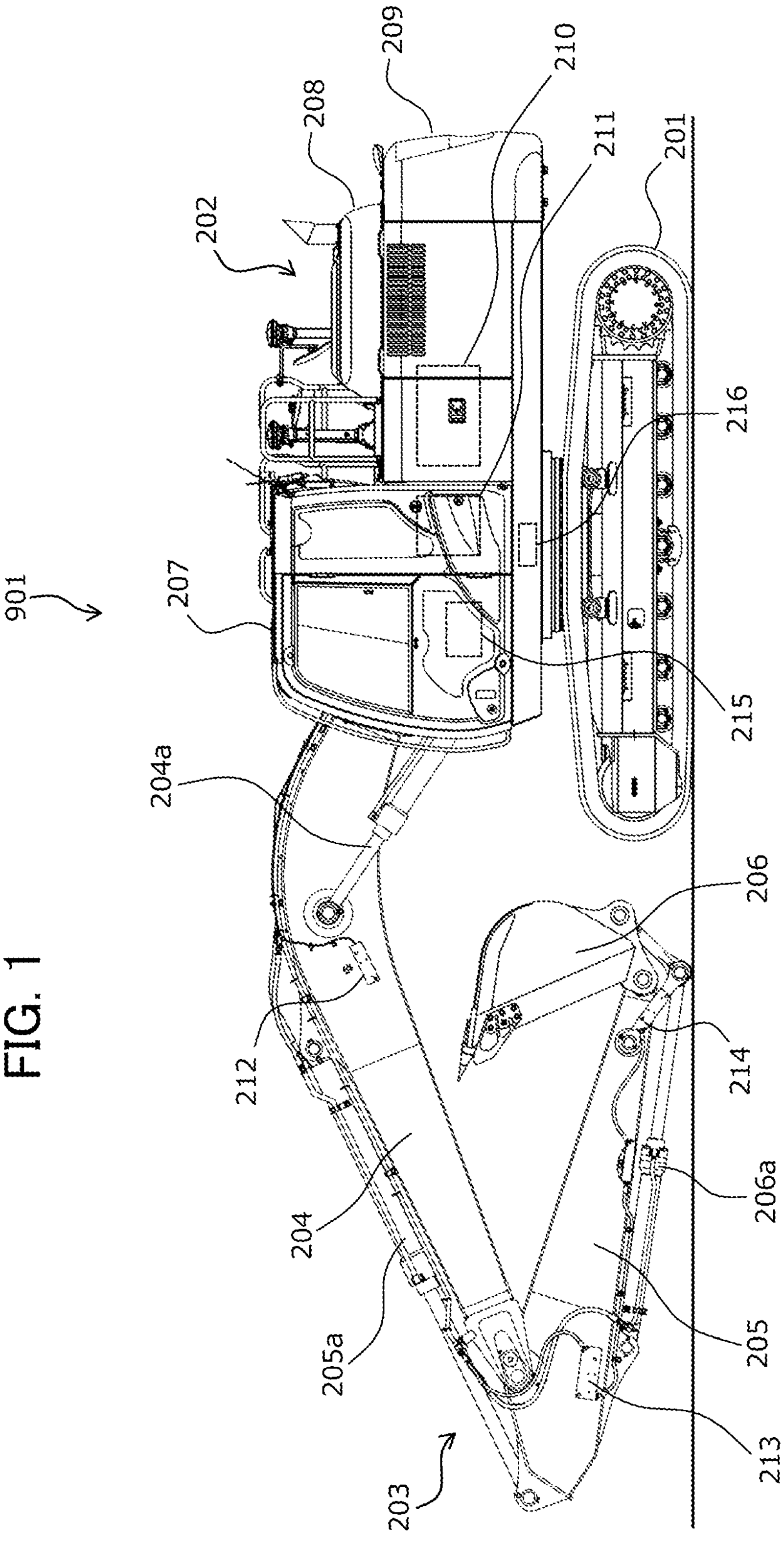
FIG. 1 is a side view of a hydraulic excavator according to an embodiment of the present invention.

FIG. 1 is a side view of the hydraulic excavator according to the present embodiment. As illustrated in FIG. 1, a hydraulic excavator 901 includes a track structure 201, a swing structure 202 that is swingably disposed on the track structure 201 and configures a machine body, and a work device 203 that is attached to the swing structure 202 pivotally in the upward-downward direction and executes excavation work of earth and sand and so forth. The swing structure 202 is driven by a swing motor 211.

The work device 203 has a boom 204 attached to the swing structure 202 pivotally in the upward-downward direction, an arm 205 attached to the tip of the boom 204 pivotally in the upward-downward direction, a bucket 206 attached to the tip of the arm 205 pivotally in the upward-downward direction, a boom cylinder 204*a* that is an actuator that drives the boom 204, an arm cylinder 205*a* that is an actuator that drives the arm 205, and a bucket cylinder 206*a* that is an actuator that drives the bucket 206. Inertia measurement devices 212, 213, and 214 that sense the posture and the operation state of the boom 204, the arm 205, and the bucket 206 are installed on the work device 203. Inertia measurement devices 215 and 216 that sense the posture and the rotation speed of the swing structure 202 are installed on the swing structure 202. That is, the inertia measurement devices 212 to 216 in the present embodiment configure a posture sensor that senses the posture of the swing structure 202 and the work device 203.

A cab 207 is disposed at a front-side position on the swing structure 202, and a counterweight 209 for ensuring the weight balance of the machine body is attached to a rear-side position. A machine chamber 208 is disposed between the cab 207 and the counterweight 209. An engine (not illustrated), a control valve 210, the swing motor 211, hydraulic pumps 1 to 3 (illustrated in FIG. 2A), and so forth are housed in the machine chamber 208. The control valve 210 controls the flow of a hydraulic operating fluid from the hydraulic pumps to the respective actuators.

Figure 2A:
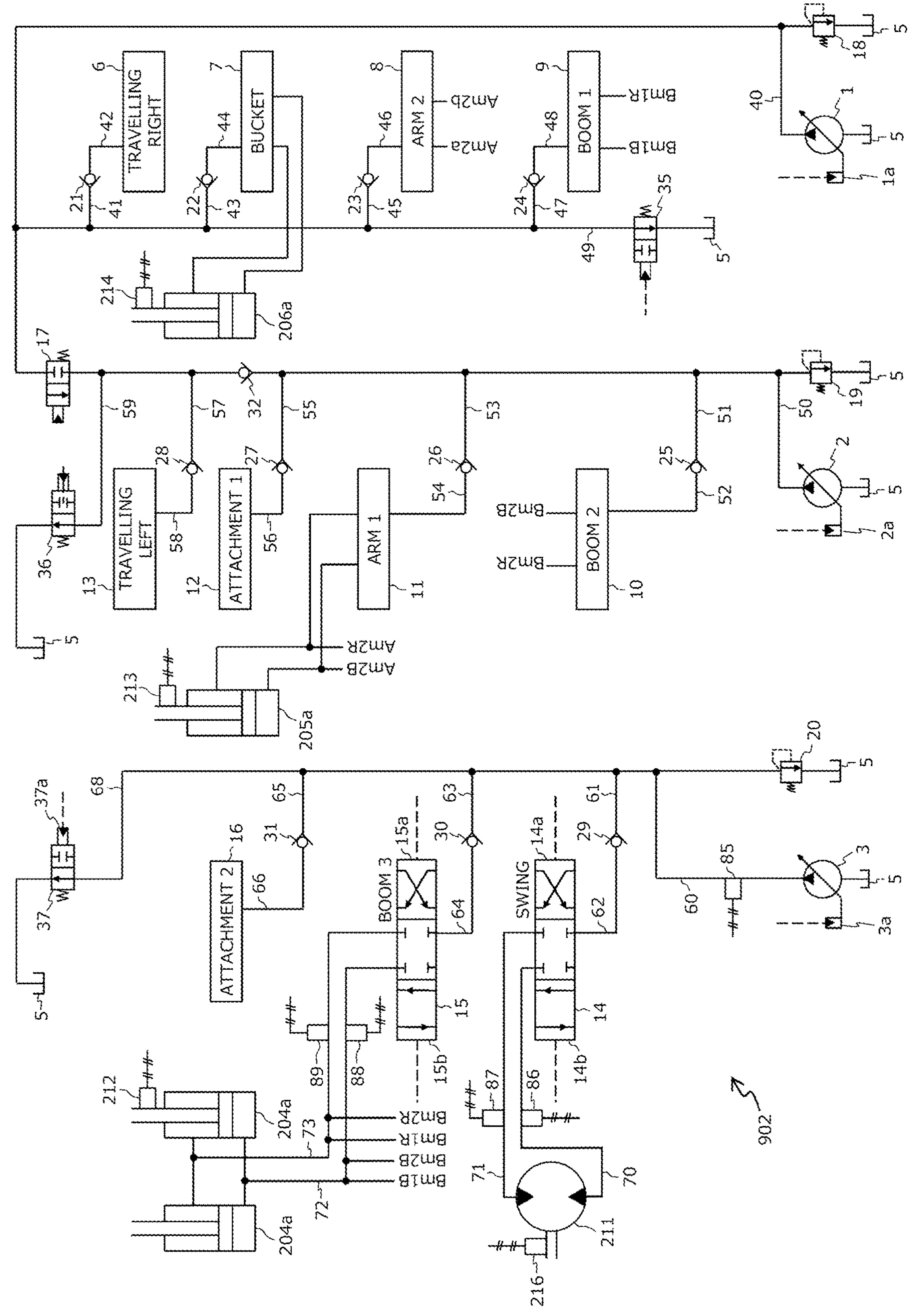
FIG. 2A is a circuit diagram (1/2) of a hydraulic drive system mounted in the hydraulic excavator illustrated in FIG. 1.
Figure 2B:
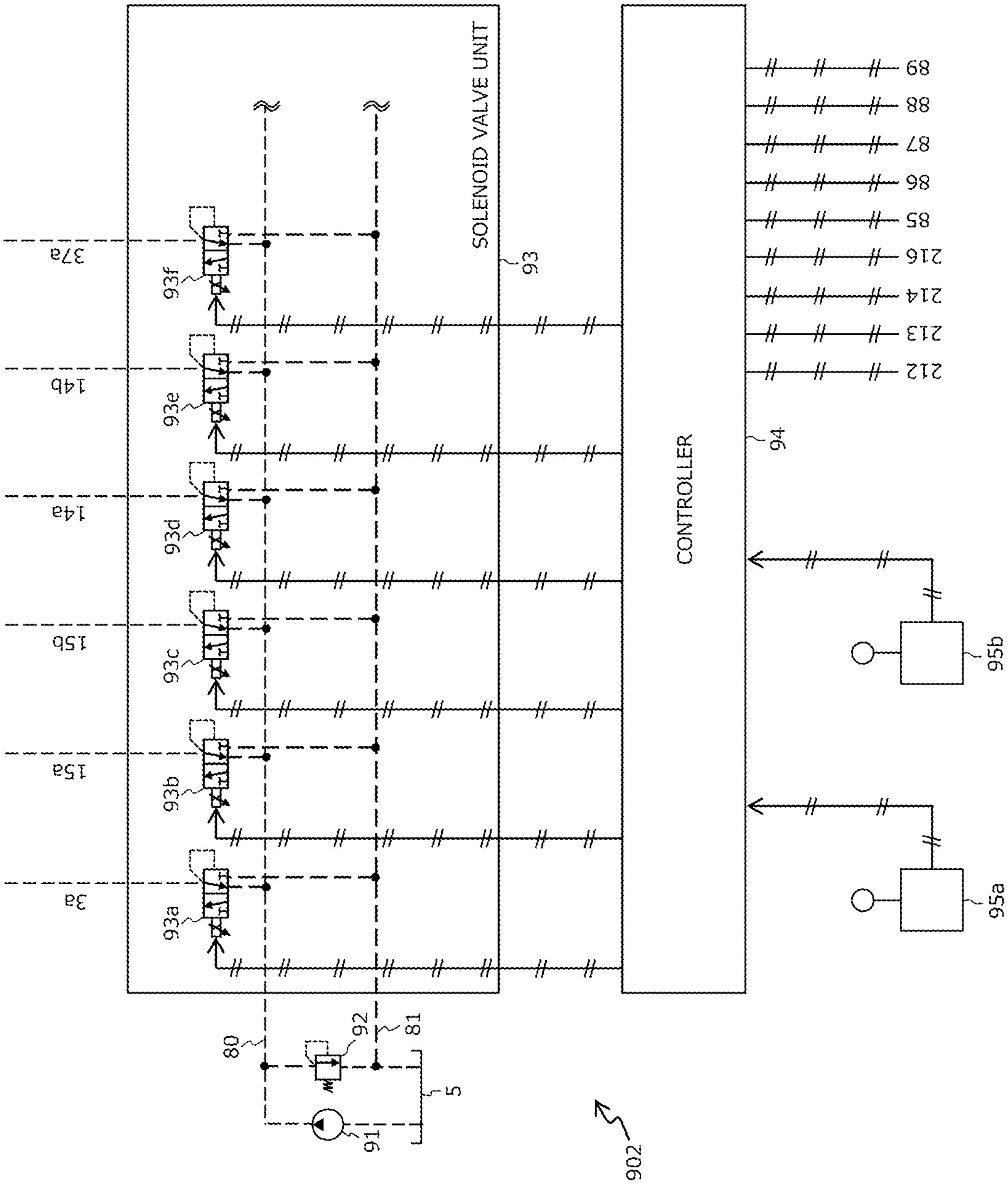
FIG. 2B is a circuit diagram (2/2) of the hydraulic drive system mounted in the hydraulic excavator illustrated in FIG. 1.

FIG. 2A and FIG. 2B are circuit diagrams of a hydraulic drive system mounted in the hydraulic excavator 901.

(Configuration)

A hydraulic drive system 902 includes three main hydraulic pumps (for example, first hydraulic pump 1, second hydraulic pump 2, and third hydraulic pump 3 formed of variable displacement hydraulic pumps), a pilot pump 91, and a hydraulic operating fluid tank 5 that supplies an oil to the hydraulic pumps 1 to 3 and the pilot pump 91. The hydraulic pumps 1 to 3 and the pilot pump 91 are driven by the engine (not illustrated).

The tilting angle of the first hydraulic pump 1 is controlled by a regulator annexed to the first hydraulic pump 1. The regulator of the first hydraulic pump 1 has a flow rate control command pressure port 1*a* and is driven by a command pressure that acts on the flow rate control command pressure port 1*a*. The tilting angle of the second hydraulic pump 2 is controlled by a regulator annexed to the second hydraulic pump 2. The regulator of the second hydraulic pump 2 has a flow rate control command pressure port 2*a* and is driven by a command pressure that acts on the flow rate control command pressure port 2*a*. The tilting angle of the third hydraulic pump 3 is controlled by a regulator annexed to the third hydraulic pump 3. The regulator of the third hydraulic pump 3 has a flow rate control command pressure port 3*a* and is driven by a command pressure that acts on the flow rate control command pressure port 3*a*.

A travelling-right directional control valve 6, a bucket directional control valve 7, a second arm directional control valve 8, and a first boom directional control valve 9 are connected in parallel to a pump line 40 of the first hydraulic pump 1 through flow lines 41 and 42, flow lines 43 and 44, flow lines 45 and 46, and flow lines 47 and 48, respectively. Check valves 21 to 24 are disposed on the flow lines 41 and 42, the flow lines 43 and 44, the flow lines 45 and 46, and the flow lines 47 and 48, respectively, in order to prevent the reverse flow of the hydraulic fluid to the pump line 40. The travelling-right directional control valve 6 controls the flow of the hydraulic fluid supplied from the first hydraulic pump 1 to a travelling right motor that is not illustrated in a pair of travelling motors that drive the track structure 201. The bucket directional control valve 7 controls the flow of the hydraulic fluid supplied from the first hydraulic pump 1 to the bucket cylinder 206*a*. The second arm directional control valve 8 controls the flow of the hydraulic fluid supplied from the first hydraulic pump 1 to the arm cylinder 205*a*. The first boom directional control valve 9 controls the flow of the hydraulic fluid supplied from the first hydraulic pump 1 to the boom cylinder 204*a*. The pump line 40 is connected to the hydraulic operating fluid tank 5 through a main relief valve 18 in order to protect the circuit from an excessive pressure rise. The pump line 40 is connected to the hydraulic operating fluid tank 5 through a bleed-off valve 35 in order to discharge a surplus delivered fluid of the hydraulic pump 1.

A second boom directional control valve 10, a first arm directional control valve 11, a first attachment directional control valve 12, and a travelling-left directional control valve 13 are connected in parallel to a pump line 50 of the second hydraulic pump 2 through flow lines 51 and 52, flow lines 53 and 54, flow lines 55 and 56, and flow lines 57 and 58, respectively. Check valves 25 to 28 are disposed on the flow lines 51 and 52, the flow lines 53 and 54, the flow lines 55 and 56, and the flow lines 57 and 58, respectively, in order to prevent the reverse flow of the hydraulic fluid to the pump line 50. The second boom directional control valve 10 controls the flow of the hydraulic fluid supplied from the second hydraulic pump 2 to the boom cylinder 204*a*. The first arm directional control valve 11 controls the flow of the hydraulic fluid supplied from the second hydraulic pump 2 to the arm cylinder 205*a*. The first attachment directional control valve 12 controls the flow of the hydraulic fluid supplied from the second hydraulic pump 2 to a first actuator that is not illustrated and drives a first special attachment such as a cruncher disposed instead of the bucket 206, for example. The travelling-left directional control valve 13 controls the flow of the hydraulic fluid supplied from the second hydraulic pump 2 to a travelling left motor that is not illustrated in the pair of travelling motors that drive the track structure 201. The pump line 50 is connected to the hydraulic operating fluid tank 5 through a main relief valve 19 in order to protect the circuit from an excessive pressure rise. The pump line 50 is connected to the hydraulic operating fluid tank 5 through a bleed-off valve 36 in order to discharge a surplus delivered fluid of the hydraulic pump 2. The pump line 50 is connected to the pump line 40 through a flow combining valve 17 in order to cause merging of the delivered fluid of the first hydraulic pump 1. A check valve 32 is disposed at a part that connects the flow line 55 and the flow line 57 in the pump line 50. The check valve 32 prevents the hydraulic fluid that merges into the pump line 50 from the first hydraulic pump 1 through the flow combining valve 17 from flowing into the directional control valves 10 to 12 other than the travelling-left directional control valve 13.

A swing directional control valve 14, a third boom directional control valve 15, and a second attachment directional control valve 16 are connected in parallel to a pump line 60 of the third hydraulic pump 3 through flow lines 61 and 62, flow lines 63 and 64, and flow lines 65 and 66, respectively. Check valves 29 to 31 are disposed on the flow lines 61 and 62, the flow lines 63 and 64, and the flow lines 65 and 66, respectively, in order to prevent the reverse flow of the hydraulic fluid to the pump line 60. The swing directional control valve 14 controls the flow of the hydraulic fluid supplied from the third hydraulic pump 3 to the swing motor 211. The third boom directional control valve 15 controls the flow of the hydraulic fluid supplied from the third hydraulic pump 3 to the boom cylinder 204*a*. The second attachment directional control valve 16 is used to control the flow of the hydraulic fluid supplied to a second actuator when a second special attachment having the second actuator is mounted in addition to the first special attachment or when the second special attachment having two actuators including the first actuator and the second actuator, is mounted instead of the first special actuator. The pump line 60 is connected to the hydraulic operating fluid tank 5 through a main relief valve 20 in order to protect the circuit from an excessive pressure rise. The pump line 60 is connected to the hydraulic operating fluid tank 5 through a bleed-off valve 37 in order to discharge a surplus delivered fluid of the hydraulic pump 3.

A pressure sensor 85 that senses the delivery pressure (pump pressure $P_{Pmp3}$) of the third hydraulic pump 3 is disposed on the pump line 60. Pressure sensors 86 and 87 for sensing the pressure of the supply-side port of the swing motor 211 (swing meter-in pressure $P_{MISwg}$) or the pressure of the discharge-side port (swing meter-out pressure $P_{MOSwg}$) are disposed on flow lines 70 and 71 that connect the swing motor 211 and the swing directional control valve 14. Pressure sensors 88 and 89 for sensing the pressure of the supply-side port of the boom cylinder 204*a* (boom meter-in pressure $P_{MIBm}$) are disposed on flow lines 72 and 73 that connect the boom cylinder 204*a* and the boom directional control valves 9, 10, and 15. Output values of the pressure sensors 85 to 89 are inputted to a controller 94.

Figure 3:
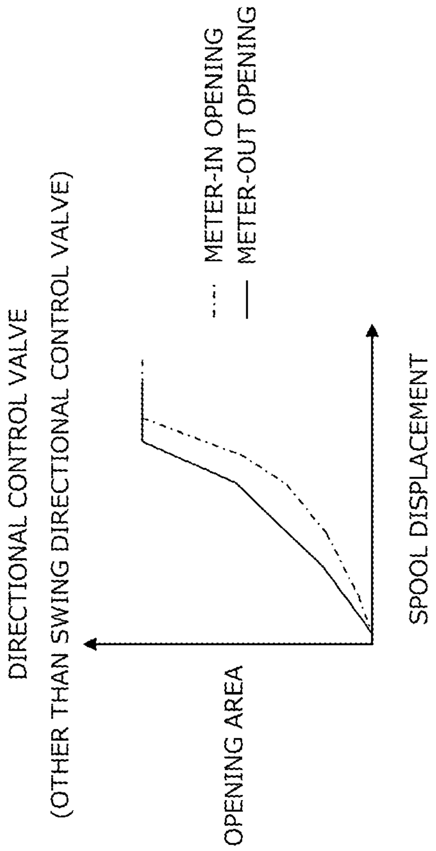
FIG. 3 is a diagram illustrating an opening characteristic of directional control valves (other than swing directional control valve) illustrated in FIG. 2A.

The directional control valves 6 to 13, 15, and 16 other than the swing directional control valve 14 have an opening characteristic illustrated in FIG. 3. In FIG. 3, the meter-in opening area increases from zero to the maximum opening area depending on the spool displacement. The meter-out opening area also increases from zero to the maximum opening area depending on the spool displacement similarly. However, the meter-out opening area is set to a smaller value than the meter-in opening area with respect to the spool displacement. This makes it possible to control the driving speed of the actuator by the meter-in opening.

Figure 4:
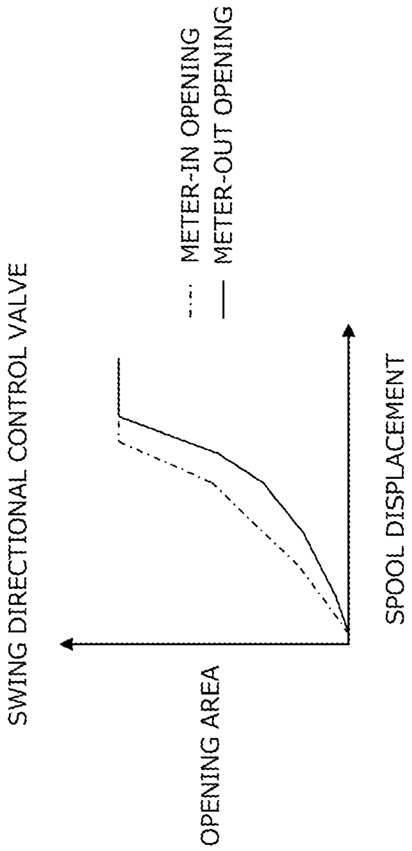
FIG. 4 is a diagram illustrating an opening characteristic of the swing directional control valve illustrated in FIG. 2A.

The swing directional control valve 14 has an opening characteristic illustrated in FIG. 4. In FIG. 4, the meter-in opening area increases from zero to the maximum opening area depending on the spool displacement. The meter-out opening area also increases from zero to the maximum opening area depending on the spool displacement similarly. However, the meter-out opening area is set to a smaller value than the meter-in opening area with respect to the spool displacement. This makes it possible to control the back pressure of the swing motor 211 by the meter-out opening.

In FIG. 2B, the delivery port of the pilot pump 91 is connected to the hydraulic operating fluid tank 5 through a pilot relief valve 92 for pilot primary pressure generation and is connected to one input port of each of solenoid valves 93*a* to 93*f* incorporated in a solenoid valve unit 93 through a flow line 80. The other input ports of the solenoid valves 93*a* to 93*f* are connected to the hydraulic operating fluid tank 5 through a flow line 81. The solenoid valves 93*a* to 93*f* each reduce a pilot primary pressure in response to a command signal from the controller 94 and output the resulting pressure as a command pressure.

The output port of the solenoid valve 93*a* is connected to the flow rate control command pressure port 2*a* of the regulator of the second hydraulic pump 2. The output ports of the solenoid valves 93*b* and 93*c* are connected to the pilot ports of the second boom directional control valve 10. The output ports of the solenoid valves 93*d* and 93*e* are connected to the pilot ports of the first arm directional control valve 11. The output port of the solenoid valve 93*f* is connected to a command pressure port 37*a* of the bleed-off valve 37.

For simplification of explanation, illustration is omitted regarding solenoid valves for the flow rate control command pressure ports 1*a* and 2*a* of the regulators of the first hydraulic pump 1 and the second hydraulic pump 2, solenoid valves for the travelling-right directional control valve 6, solenoid valves for the bucket directional control valve 7, solenoid valves for the second arm directional control valve 8, solenoid valves for the first boom directional control valve 9, solenoid valves for the second boom directional control valve 10, solenoid valves for the first arm directional control valve 11, solenoid valves for the first attachment directional control valve 12, solenoid valves for the travelling-left directional control valve 13, solenoid valves for the second attachment directional control valve 16, and solenoid valves for the bleed-off valves 35 and 36.

The hydraulic drive system 902 includes a boom operation lever 95*a* that allows switching operation of the first boom directional control valve 9, the second boom directional control valve 10, and the third boom directional control valve 15 and a swing operation lever 95*b* that allows switching operation of the swing directional control valve 14. For simplification of explanation, illustration is omitted regarding a travelling-right operation lever to execute switching operation of the travelling-right directional control valve 6, a bucket operation lever to execute switching operation of the bucket directional control valve 7, an arm operation lever that allows switching operation of the first arm directional control valve 11 and the second arm directional control valve 8, a first attachment operation lever to execute switching operation of the first attachment directional control valve 12, a travelling-left operation lever to execute switching operation of the travelling-left directional control valve 13, a swing operation lever to execute switching operation of the swing directional control valve 14, and a second attachment operation lever to execute switching operation of the second attachment directional control valve 16.

The hydraulic drive system 902 includes the controller 94. The controller 94 outputs a command signal to the solenoid valves 93*a* to 93*f* (including the solenoid valves that are not illustrated) that the solenoid valve unit 93 has according to the input amount of the operation levers 95*a* and 95*b*.

Figure 5:
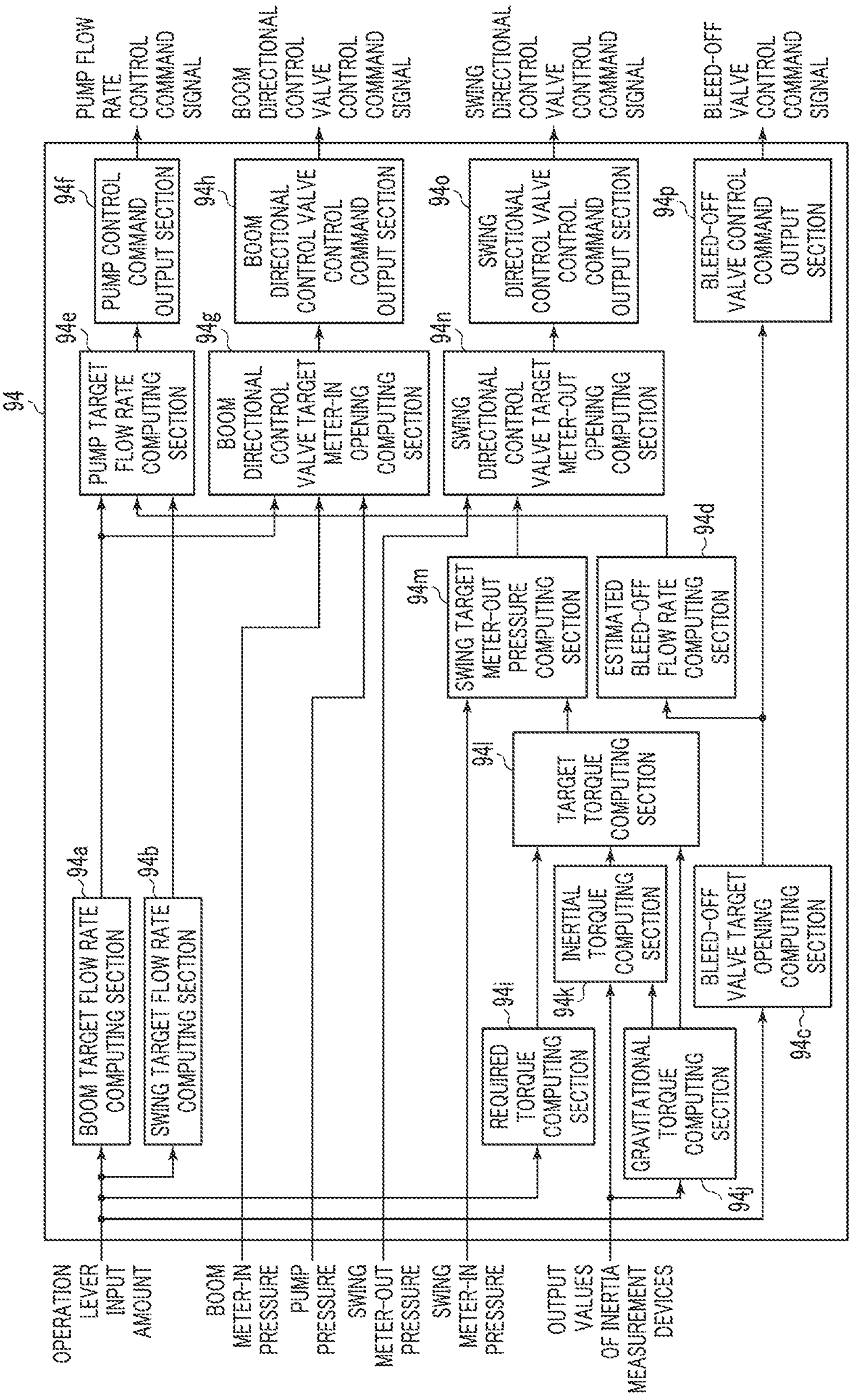
FIG. 5 is a functional block diagram of a controller illustrated in FIG. 2B.

FIG. 5 is a functional block diagram of the controller 94. In FIG. 5, the controller 94 has a boom target flow rate computing section 94*a*, a swing target flow rate computing section 94*b*, a bleed-off valve target opening computing section 94*c*, an estimated bleed-off flow rate computing section 94*d*, a pump target flow rate computing section 94*e*, a pump control command output section 94*f*, a boom directional control valve target meter-in opening computing section 94*g*, and a boom directional control valve control command output section 94*h*. The controller 94 has also a required torque computing section 94*i*, a gravitational torque computing section 94*j*, an inertial torque computing section 94*k*, a target torque computing section 941, a swing target meter-out pressure computing section 94*m*, a swing directional control valve target meter-out opening computing section 94*n*, a swing directional control valve control command output section 940, and a bleed-off valve control command output section 94*p*.

Figure 6:
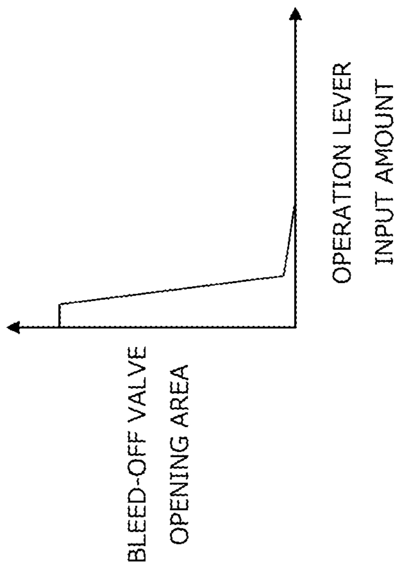
FIG. 6 is a diagram illustrating an opening characteristic with respect to the operation lever input amount regarding bleed-off valves illustrated in FIG. 2A.

The boom target flow rate computing section 94*a* calculates a target value (boom target flow rate $Q_{TgtBm}$) of the flow rate of supply to the boom cylinder 204*a* (boom flow rate) on the basis of the operation lever input amount. Specifically, the boom target flow rate computing section 94*a* calculates the boom target flow rate $Q_{TgtBm}$ according to the operation lever input amount in accordance with a boom flow rate characteristic with respect to the operation lever input amount, set in advance. The swing target flow rate computing section 94*b* calculates a target value (swing target flow rate $Q_{TgtSwg}$) of the flow rate of supply to the swing motor 211 (swing flow rate) on the basis of the operation lever input amount. Specifically, the swing target flow rate computing section 94*b* calculates the swing target flow rate $Q_{TgtSwg}$ according to the operation lever input amount in accordance with a swing flow rate characteristic with respect to the operation lever input amount, set in advance. The bleed-off valve target opening computing section 94*c* calculates a target opening area of the bleed-off valves 35 to 37 (bleed-off valve target opening area) on the basis of the operation lever input amount. Specifically, the bleed-off valve target opening computing section 94*c* calculates the bleed-off valve target opening area according to the operation lever input amount in accordance with a bleed-off valve opening characteristic with respect to the operation lever input amount (illustrated in FIG. 6), set in advance.

The estimated bleed-off flow rate computing section 94*d* calculates an estimated value of the bleed-off flow rate (estimated bleed-off flow rate $Q_{EstBo}$) on the basis of the bleed-off valve target opening area calculated in the bleed-off valve target opening computing section 94*c* and the pump pressure $P_{Pmp3}$ obtained from the output value of the pressure sensor 85. The pump target flow rate computing section 94*e* calculates a pump target flow rate $Q_{TgtPmp}$ on the basis of the boom target flow rate $Q_{TgtBm}$ calculated in the boom target flow rate computing section 94*a*, the swing target flow rate $Q_{TgtSwg}$ calculated in the swing target flow rate computing section 94*b*, and the estimated bleed-off flow rate $Q_{EstBo}$ calculated in the estimated bleed-off flow rate computing section 94*d*. The pump control command output section 94*f* outputs, to the solenoid valve 93*a*, a command signal (pump flow rate control command signal) according to the pump target flow rate $Q_{TgtPmp}$ calculated in the pump target flow rate computing section 94*e* in accordance with a solenoid valve command signal characteristic with respect to the pump flow rate, set in advance.

The boom directional control valve target meter-in opening computing section 94*g* calculates a target meter-in opening area $A_{TgtMIBm}$ of the boom directional control valves 9, 10, and 15 on the basis of the boom target flow rate $Q_{TgtBm}$ calculated in the boom target flow rate computing section 94*a*, the pump pressure $P_{Pmp3}$ obtained from the output value of the pressure sensor 85, and the boom meter-in pressure $P_{MIBm}$ obtained from the output value of the pressure sensor 88 (89). The boom directional control valve control command output section 94*h* outputs, to the solenoid valve 93*b* (93*c*), a command signal (boom directional control valve control command signal) according to the target meter-in opening area $A_{TgtMIBm}$ of the boom directional control valves 9, 10, and 15 calculated in the boom directional control valve target meter-in opening computing section 94*g* in accordance with a solenoid valve command signal characteristic with respect to the meter-in opening area of the boom directional control valves 9, 10, and 15, set in advance.

The required torque computing section 94*i* calculates swing required torque according to the operation lever input amount in accordance with a swing required torque characteristic with respect to the operation lever input amount, set in advance. The gravitational torque computing section 94*j* calculates the gravitational component of the swing moment as gravitational torque $T_{Gravity}$ on the basis of the output values of the inertia measurement devices 212 to 216 and machine body specification values. The inertial torque computing section 94*k* calculates the inertial component of the swing moment as inertial torque $T_{Inertia}$ on the basis of the gravitational torque $T_{Gravity}$ calculated in the gravitational torque computing section 94*j* and the output values of the inertia measurement devices 212 to 216. The target torque computing section 94*l* calculates target torque $T_{TgtSwg}$ of the swing motor 211 on the basis of the swing required torque calculated in the required torque computing section 94*i*, the gravitational torque $T_{Gravity}$ calculated in the gravitational torque computing section 94*j*, and the inertial torque $T_{Inertia}$ calculated in the inertial torque computing section 94*k*.

The swing target meter-out pressure computing section 94*m* calculates a swing target meter-out pressure $P_{MOTgtSwg}$ on the basis of the target torque $T_{TgtSwg}$ of the swing motor 211 calculated in the target torque computing section 94*l* and the swing meter-in pressure $P_{MISwg}$ obtained from the output value of the pressure sensor 86 (87). The swing directional control valve target meter-out opening computing section 94*n* calculates a target meter-out opening area $A_{TgtMOSwg}$ of the swing directional control valve 14 on the basis of the swing target meter-out pressure $P_{MOTgtSwg}$ Calculated in the swing target meter-out pressure computing section 94*m* and the swing meter-out pressure $P_{MOSwg}$ obtained from the output value of the pressure sensor 86 (87). The swing directional control valve control command output section 940 outputs, to the solenoid valve 93*d* (93*e*), a command signal (swing directional control valve control command signal) according to the target meter-out opening area $A_{TgtMOSwg}$ of the swing directional control valve 14 calculated in the swing directional control valve target meter-out opening computing section 94*n* in accordance with a solenoid valve command signal characteristic with respect to the meter-out opening area of the swing directional control valve 14, set in advance.

The bleed-off valve control command output section 94*p* outputs, to the solenoid valve 93*f*, a command signal (bleed-off valve control command signal) according to the bleed-off valve target opening area calculated in the bleed-off valve target opening computing section 94*c* in accordance with a solenoid valve command signal characteristic with respect to the opening area of the bleed-off valves 35 to 37, set in advance.

Figure 7:
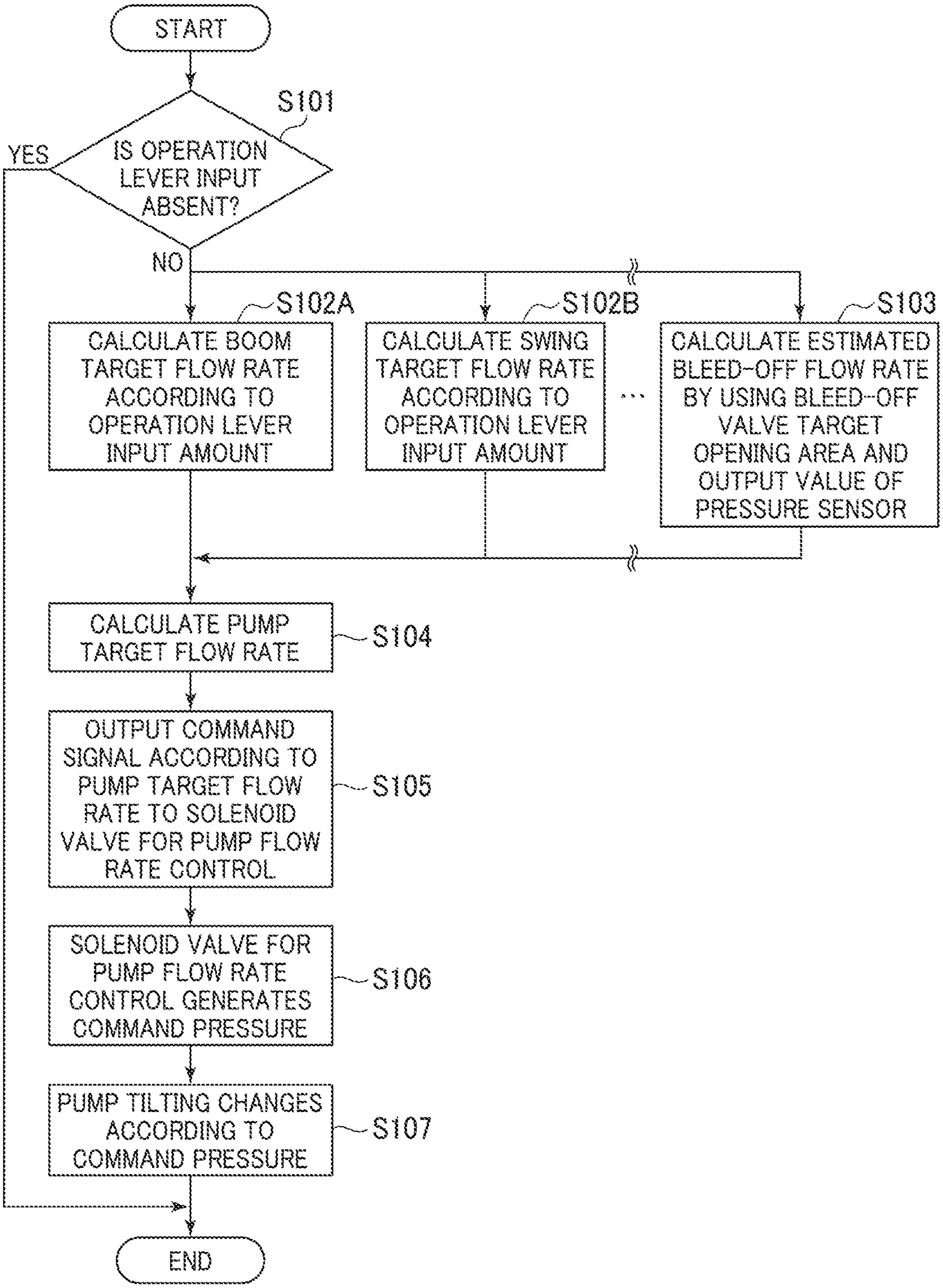
FIG. 7 is a flowchart illustrating processing relating to pump flow rate control by the controller illustrated in FIG. 2B.

FIG. 7 is a flowchart illustrating processing relating to pump flow rate control by the controller 94. In the following, only processing relating to flow rate control of the third hydraulic pump 3 will be described. Processing relating to flow rate control of the other hydraulic pumps is similar to this, and therefore description thereof is omitted.

The controller 94 first determines whether or not an operation lever input is absent (step S101). The operation lever input mentioned here is an operation lever input for the actuators 204*a* and 211 connected to the pump line 60 of the third hydraulic pump 3. When determining that an operation lever input is absent (YES) in the step S101, the controller 94 ends this flow.

When it is determined that an operation lever input is present (NO) in the step S101, the boom target flow rate computing section 94*a* calculates the boom target flow rate $Q_{TgtBm}$ according to the operation lever input amount in accordance with the boom target flow rate characteristic with respect to the operation lever input amount, set in advance (step S102A).

Concurrently with the step S102A, the swing target flow rate computing section 94*b* calculates the swing target flow rate $Q_{TgtSwg}$ according to the operation lever input amount in accordance with the swing target flow rate characteristic with respect to the operation lever input amount, set in advance (step S102B). Although illustration is omitted, target flow rates are similarly calculated also regarding the other actuators connected to the pump line 60 of the third hydraulic pump 3.

Concurrently with the steps S102A and S102B, the estimated bleed-off flow rate computing section 94*d* calculates the estimated bleed-off flow rate $Q_{EstBo}$ from the following expression by using a target opening area $A_{TgtBo}$ of the bleed-off valve 37 calculated in the bleed-off valve target opening computing section 94*c* and the pump pressure $P_{Pmp3}$ Obtained from the output value of the pressure sensor 85 (step S103).

[Math. 1]

$$Q_{EstBO} = C_d \times A_{TgtBO}\sqrt{(2(P_{Pmp3} - P_{Tank})/\rho)} \quad \text{Expression 1}$$

Here, $C_d$ is a flow rate coefficient. $P_{Tank}$ is the tank pressure. ρ is the hydraulic operating fluid density.

Subsequently to the steps S102A, S102B, and S103, the pump target flow rate computing section 94*e* calculates the pump target flow rate $Q_{TgtPmp}$ from the following expression by using the boom target flow rate $Q_{TgtBm}$, the swing target flow rate $Q_{TgtSwg}$, and the estimated bleed-off flow rate $Q_{EstBo}$ (step S104).

[Math. 2]

$$Q_{TgtPnp} = Q_{TgtBm} + Q_{TgtSwg} + \ldots + Q_{EstBO} \quad \text{Expression 2}$$

Subsequently to the step S104, the pump control command output section 94*f* outputs the command signal (pump flow rate control command signal) according to the pump target flow rate $Q_{TgtPmp}$ calculated in the pump target flow rate computing section 94*e* to the solenoid valve 93*a* for pump flow rate control of the third hydraulic pump 3 in accordance with the solenoid valve command signal characteristic with respect to the pump flow rate, set in advance (step S105).

Subsequently to the step S105, the solenoid valve 93*a* for pump flow rate control of the third hydraulic pump 3 is caused to generate the command pressure (step S106), and the tilting of the third hydraulic pump 3 is changed according to this command pressure (step S107), to end this flow.

Figure 8:
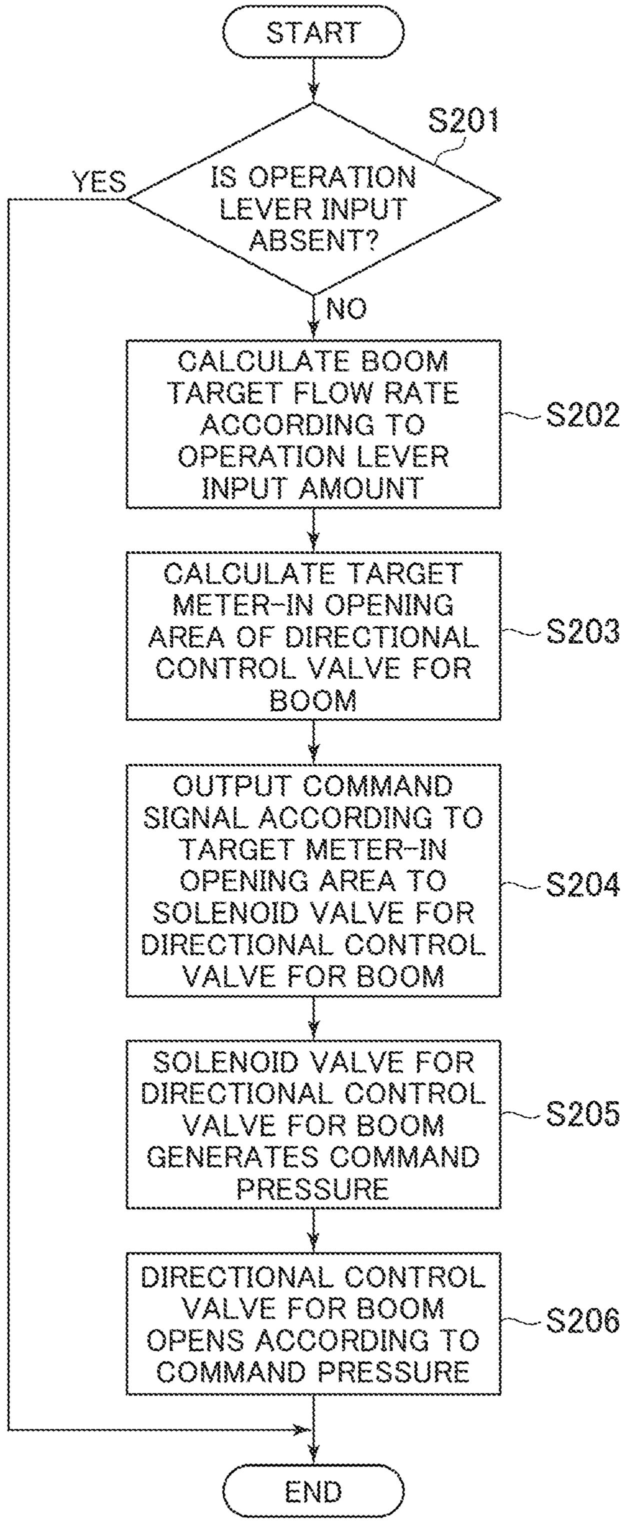
FIG. 8 is a flowchart illustrating processing relating to opening control of boom directional control valves by the controller illustrated in FIG. 2B.

FIG. 8 is a flowchart illustrating processing relating to opening control of the boom directional control valves 9, 10, and 15 by the controller 94. In the following, only processing relating to opening control of the third boom directional control valve 15 will be described. Processing relating to opening control of the other directional control valves excluding the swing directional control valve 14 is similar to this, and therefore description thereof is omitted.

The controller 94 first determines whether or not an operation lever input is absent (step S201). When determining that an operation lever input is absent (YES) in the step S201, the controller 94 ends this flow.

When it is determined that an operation lever input is present (NO) in the step S201, the boom target flow rate computing section 94*a* calculates the boom target flow rate $Q_{TgtBm}$ according to the operation lever input amount in accordance with the boom target flow rate characteristic with respect to the operation lever input amount, set in advance (step S202).

Subsequently to the step S202, the boom directional control valve target meter-in opening computing section 94*g* calculates the target meter-in opening area $A_{TgtMIBm}$ of the third boom directional control valve 15 by using the following expression on the basis of the boom target flow rate $Q_{TgtBm}$ calculated in the boom target flow rate computing section 94*a*, the pump pressure $P_{Pmp3}$ of the third hydraulic pump 3 obtained from the output value of the pressure sensor 85, and the boom meter-in pressure $P_{MIBm}$ obtained from the output value of the pressure sensor 88 (89) (step S203).

[Math. 3]

$$A_{TgtMIBm} = Q_{TgtBm}/\left(C_d \times \sqrt{(2(P_{Pmp3} - P_{MIBm})/\rho)}\right) \quad \text{Expression 3}$$

Here, $C_d$ is a flow rate coefficient and ρ is the hydraulic operating fluid density.

Subsequently to the step S203, the boom directional control valve control command output section 94*h* outputs the command signal according to the target meter-in opening area $A_{TgtMIBm}$ calculated in the boom directional control valve target meter-in opening computing section 94*g* to the solenoid valve 93*b* (93*c*) for the third boom directional control valve 15 in accordance with the solenoid valve command signal characteristic with respect to the meter-in opening area of the third boom directional control valve 15, set in advance (step S204).

Subsequently to the step S204, the solenoid valves 93*b* and 93*c* for the third boom directional control valve 15 are caused to generate the command pressure (step S205), and the third boom directional control valve 15 is opened according to this command pressure (step S206), to end this flow.

Figure 9:
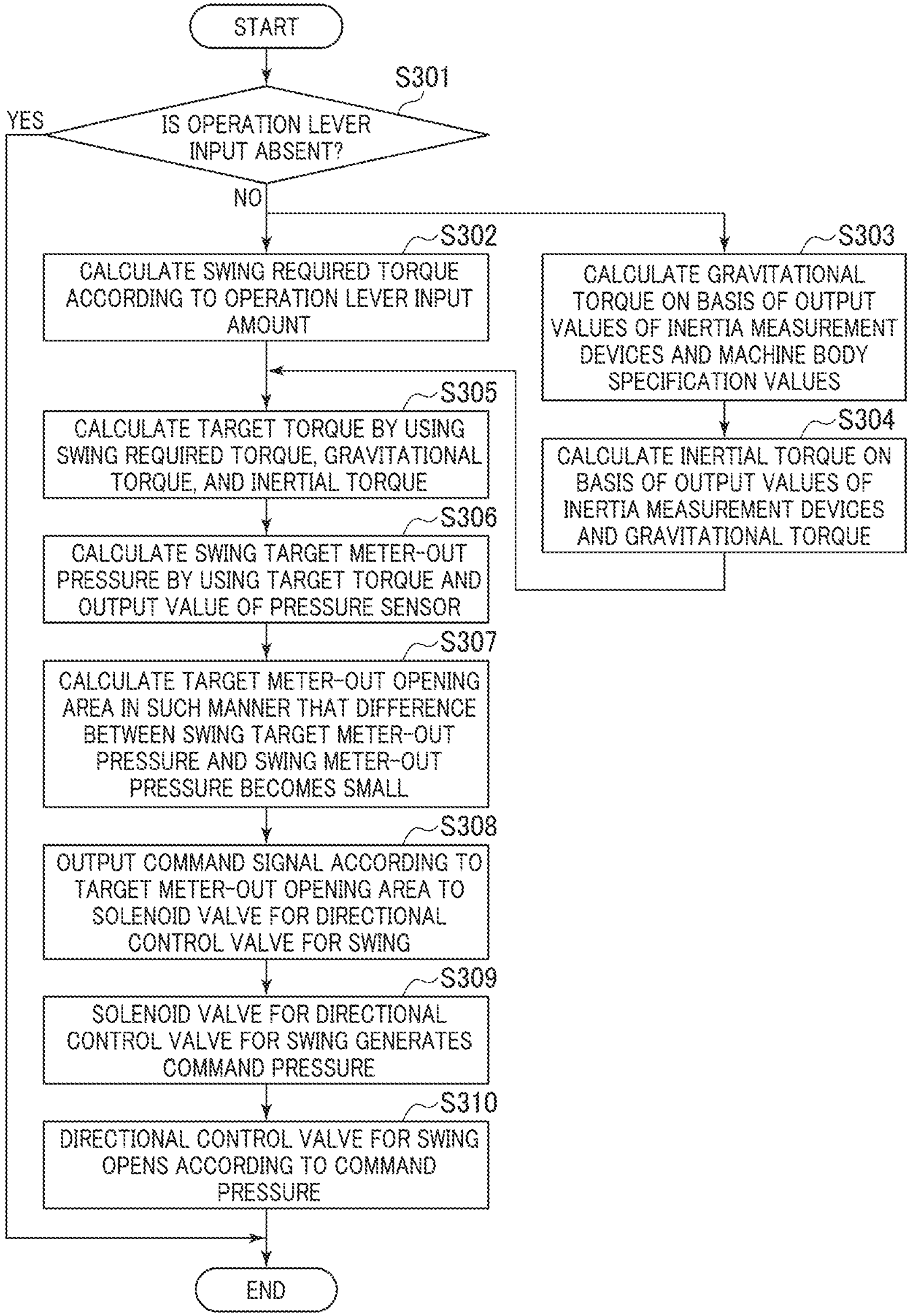
FIG. 9 is a flowchart illustrating processing relating to opening control of the swing directional control valve by the controller illustrated in FIG. 2B.

FIG. 9 is a flowchart illustrating processing relating to opening control of the swing directional control valve 14 by the controller 94.

The controller 94 first determines whether or not a swing operation lever input is absent (step S301). When determining that a swing operation lever input is absent (YES) in the step S201, the controller 94 ends this flow.

When it is determined that a swing operation lever input is present (NO) in the step S301, the required torque computing section 94*i* calculates swing required torque $T_{ReqSwg}$ according to the operation lever input amount in accordance with the swing required torque characteristic with respect to the swing operation lever input amount, set in advance (step S302).

Concurrently with the step S302, the gravitational torque computing section 94*j* calculates the gravitational component of the swing moment as the gravitational torque $T_{Gravity}$ on the basis of the output values of the inertia measurement devices 212 to 216 and machine body specification values (mainly dimensions of structures and so forth) (S303).

Subsequently to the step S303, the inertial torque computing section 94*k* calculates the inertial component of the swing moment as the inertial torque $T_{Inertia}$ on the basis of the gravitational torque $T_{Gravity}$ calculated by the gravitational torque computing section 94*j* and the output values of the inertia measurement devices 212 to 216 (step S304).

Subsequently to the steps S302 and S304, the target torque computing section 94*l* calculates the target torque $T_{TgtSwg}$ of the swing motor 211 from the following expression by using the swing required torque $T_{ReqSwg}$ calculated in the required torque computing section 94*i*, the gravitational torque $T_{Gravity}$ calculated in the gravitational torque computing section 94*j*, and the inertial torque $T_{Inertia}$ calculated in the inertial torque computing section 94*k* (step S305).

[Math. 4]

$$T_{TgtSwg} = T_{ReqSwg} - T_{Gravity} - T_{Inertia} \quad \text{Expression 4}$$

Here, torque in the same rotational direction as the swing required torque $T_{ReqSwg}$ is deemed as positive.

Subsequently to the step S305, the swing target meter-out pressure computing section 94*m* calculates the swing target meter-out pressure $P_{MOTgtSwg}$ from the following expression by using the target torque $T_{TgtSwg}$ of the swing motor 211 calculated in the target torque computing section 94*l* and the swing meter-in pressure $P_{MISwg}$ obtained from the output value of the pressure sensor 86 (87) (step S306).

[Math. 5]

$$P_{TgtMOSwg} = P_{MISwg} - (2\pi \times T_{TgtSwg}/q \times \eta) \quad \text{Expression 5}$$

Here, q is the motor capacity and n is the transmission efficiency.

Subsequently to the step S306, the swing directional control valve target meter-out opening computing section 94*n* calculates the target meter-out opening area $A_{TgtMOSwg}$ of the swing directional control valve 14 in such a manner that the difference between the swing target meter-out pressure $P_{TgtMOSwg}$ calculated in the swing target meter-out pressure computing section 94*m* and the swing meter-out pressure $P_{MOSwg}$ obtained from the output value of the pressure sensor 86 (87) becomes small (step S307).

Subsequently to the step S307, the swing directional control valve control command output section 940 outputs the command signal (swing directional control valve control command signal) according to the target meter-out opening area $A_{TgtMOSwg}$ calculated in the swing directional control valve target meter-out opening computing section 94*n* to the solenoid valve 93*d* (93*e*) for the swing directional control valve 14 in accordance with the solenoid valve command signal characteristic with respect to the meter-out opening area of the swing directional control valve 14, set in advance (step S308).

Subsequently to the step S308, the solenoid valve 93*d* (93*e*) is caused to generate the command pressure of the swing directional control valve 14 (step S309), and the swing directional control valve 14 is opened according to this command pressure (step S310), to end this flow.

Figure 10:
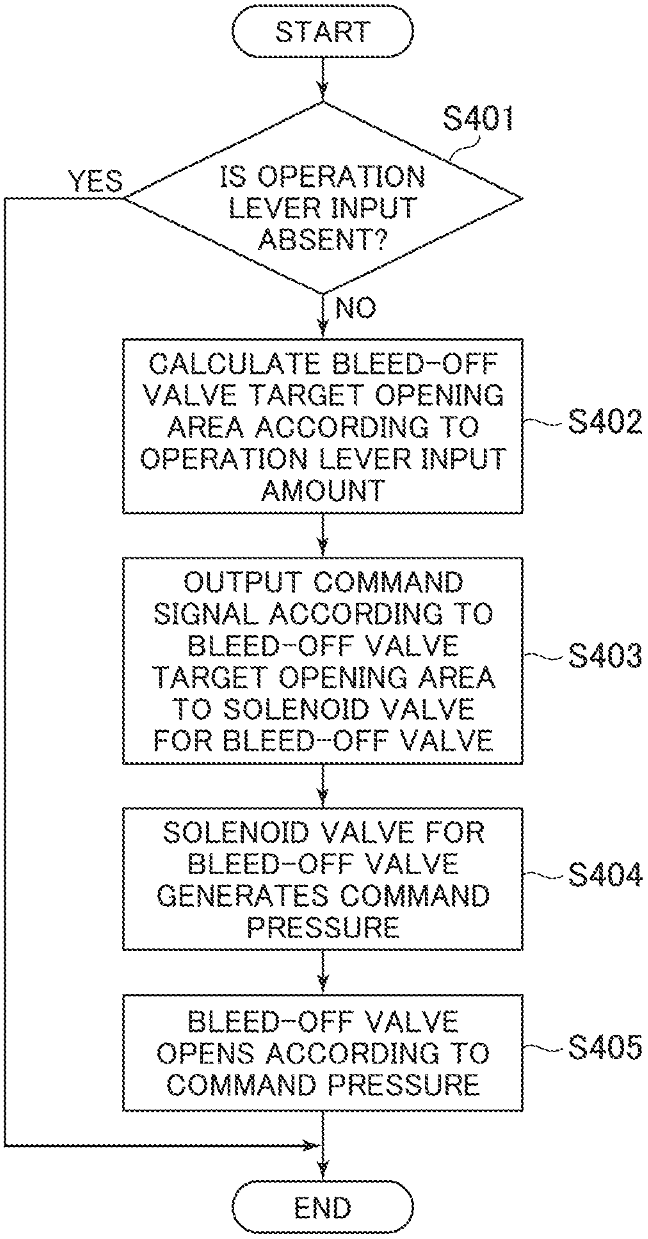
FIG. 10 is a flowchart illustrating processing relating to opening control of the bleed-off valves by the controller illustrated in FIG. 2B.

FIG. 10 is a flowchart illustrating processing relating to control of the bleed-off valves 35 to 37 by the controller 94. In the following, only processing relating to opening control of the bleed-off valve 37 disposed on the pump line 60 of the third hydraulic pump 3 will be described. Processing relating to opening control of the other bleed-off valves is similar to this, and therefore description thereof is omitted.

The controller 94 first determines whether or not an operation lever input is absent (step S401). The operation lever input mentioned here is an operation lever input for the actuators 204*a* and 211 connected to the pump line 60 of the third hydraulic pump 3. When determining that an operation lever input is absent (YES) in the step S401, the controller 94 ends this flow.

When it is determined that an operation lever input is present (NO) in the step S401, the bleed-off valve target opening computing section 94*c* calculates the target opening area $A_{TgtBo}$ of the bleed-off valve 37 according to the operation lever input amount in accordance with the bleed-off valve opening characteristic with respect to the operation lever input amount (illustrated in FIG. 6), set in advance (step S402). The operation lever input amount mentioned here is equivalent to the maximum value of the respective amounts of operation lever input to the plurality of actuators connected to the same pump line.

Subsequently to the step S402, the bleed-off valve control command output section 94*p* outputs the command signal according to the target opening area $A_{TgtBo}$ of the bleed-off valve 37 to the solenoid valve 93*f* for the bleed-off valve 37 in accordance with the solenoid valve command signal characteristic with respect to the opening area of the bleed-off valve 37, set in advance (step S403).

Subsequently to the step S403, the solenoid valve 93*f* is caused to generate the command pressure of the bleed-off valve 37 (step S404), and the bleed-off valve 36 is opened according to this command pressure (step S405), to end this flow.

(Operation)

Operation of the third hydraulic pump 3, the third boom directional control valve 15, the swing directional control valve 14, and the bleed-off valve 37 will be described as operation of the hydraulic drive system 902 when combined operation to simultaneously drive the boom cylinder 204*a* and the swing motor 211 is executed.

"Third Hydraulic Pump"

The controller 94 calculates the pump target flow rate $Q_{TgtPmp}$ Of the third hydraulic pump 3 on the basis of the input amount of the boom operation lever 95*a* and the swing operation lever 95*b*, and outputs the command signal according to the pump target flow rate $Q_{TgtPmp}$ to the solenoid valve 93*a*. The solenoid valve 93*a* generates the command pressure according to the command signal to drive the delivery flow rate of the third hydraulic pump 3.

"Third Boom Directional Control Valve"

The controller 94 calculates the target meter-in opening area $A_{TgtMIBm}$ on the basis of the boom target flow rate $Q_{TgtBm}$ calculated on the basis of the input amount of the boom operation lever 95*a*, the pump pressure $P_{Pmp3}$ sensed by the pressure sensor 85, and the boom meter-in pressure $P_{MIBm}$ sensed by the pressure sensor 88 (89), and outputs the command signal according to the target meter-in opening area $A_{TgtMIBm}$ to the solenoid valve 93*b* (93*c*). The solenoid valve 93*b* (93*c*) generates the command pressure according to the command signal to control the meter-in opening area of the third boom directional control valve 15.

"Swing Directional Control Valve"

The controller 94 calculates the target meter-out opening area $A_{TgtMOSwg}$ on the basis of the target torque $T_{TgtSwg}$ calculated from the input amount of the swing operation lever 95*b* and the gravitational torque $T_{Gravity}$ and the inertial torque $T_{Inertia}$ of the machine body, and the swing meter-in pressure $P_{MISwg}$ and the swing meter-out pressure $P_{MOSwg}$ sensed by the pressure sensors 86 and 87, and outputs the command signal according to the target meter-out opening area $A_{TgtMOSwg}$ to the solenoid valve 93*d* (93*e*). The solenoid valve 93*d* (93*e*) generates the command pressure according to the command signal to control the meter-out opening area of the swing directional control valve 14.

"Bleed-Off Valve"

The controller 94 calculates the target opening area $A_{TgtBo}$ of the bleed-off valve 37 on the basis of the input amount of the boom operation lever 95*a* and the swing operation lever 95*b*, and outputs the command signal according to the target opening area $A_{TgtBo}$ to the solenoid valve 93*f*. The solenoid valve 93*f* generates the command pressure according to the command signal to control the opening area of the bleed-off valve 37.

(Summarization)

In the present embodiment, the work machine 901 includes the track structure 201, the swing structure 202 swingably attached onto the track structure 201, the work device 203 attached to the swing structure 202, the hydraulic operating fluid tank 5, the hydraulic pump 3 of the variable displacement type that sucks in the hydraulic operating fluid from the hydraulic operating fluid tank 5 and delivers the hydraulic operating fluid, the regulator 3*a* that controls the capacity of the hydraulic pump 3, the actuator 204*a* that drives the work device 203, and the swing motor 211 that drives the swing structure 202. The work machine 901 includes also the actuator directional control valve 15 that controls the flow of the hydraulic fluid supplied from the hydraulic pump 3 to the actuator 204*a*, the swing directional control valve 14 that controls the flow of the hydraulic fluid supplied from the hydraulic pump 3 to the swing motor 211, the operation devices 95*a* and 95*b* to make an instruction of operation of the actuator 204*a* and the swing motor 211, and the controller 94 that controls the regulator 3*a*, the actuator directional control valve 15, and the swing directional control valve 14 according to the input amount of the operation devices 95*a* and 95*b*. This work machine 901 includes the first pressure sensor 85 that senses the pump pressure $P_{Pmp3}$ that is the delivery pressure of the hydraulic pump 3, the second pressure sensors 86 and 87 that sense the actuator meter-in pressure $P_{MIBm}$ that is the pressure of the meter-in side of the actuator 204*a*, the third pressure sensors 88 and 89 that sense the swing meter-in pressure $P_{MISwg}$ that is the pressure of the meter-in side of the swing motor 211 and the swing meter-out pressure that is the pressure of the meter-out side of the swing motor 211, and the posture sensors 212 to 216 that sense the posture of the swing structure 202 and the work device 203. The meter-in opening and the meter-out opening are formed of the same valve disc in each of the actuator directional control valve 15 and the swing directional control valve 14. The actuator directional control valve 15 is formed in such a manner that the meter-in opening becomes smaller than the meter-out opening with respect to valve displacement. The swing directional control valve 14 is formed in such a manner that the meter-out opening becomes smaller than the meter-in opening with respect to valve displacement. The controller 94 calculates the actuator target flow rate $Q_{TgtBm}$ that is the target value of the flow rate of the hydraulic fluid supplied from the hydraulic pump 3 to the actuator 204*a* on the basis of the input amount of the operation devices 95*a* and 95*b*, and calculates the swing target flow rate $Q_{TgtSwg}$ that is the target value of the flow rate of the hydraulic fluid supplied from the hydraulic pump 3 to the swing motor 211 on the basis of the input amount of the operation devices 95*a* and 95*b*. The controller 94 calculates the pump target flow rate $Q_{TgtPmp}$ that is the target value of the delivery flow rate of the hydraulic pump 3 on the basis of the actuator target flow rate $Q_{TgtBm}$ and the swing target flow rate $Q_{TgtSwg}$, and calculates the target meter-in opening area $A_{TgtMIBm}$ that is the target value of the meter-in opening area of the actuator directional control valve 15 on the basis of the actuator target flow rate $Q_{TgtBm}$, the pump pressure $P_{Pmp3}$, and the actuator meter-in pressure $P_{MIBm}$. The controller 94 calculates the target torque $T_{TgtSwg}$ that is the target value of input torque to the swing motor 211 on the basis of the input amount of the operation devices 95*a* and 95*b* and the output values of the posture sensors 212 to 216, and calculates the swing target meter-out pressure $P_{MOTgtSwg}$ that is the target of the swing meter-out pressure $P_{MOSwg}$ on the basis of the target torque $T_{TgtSwg}$ and the swing meter-in pressure $P_{MISwg}$. The controller 94 calculates the target meter-out opening area $A_{TgtMOSwg}$ that is the target value of the meter-out opening area of the swing directional control valve 14 on the basis of the swing target meter-out pressure $P_{MOTgtSwg}$ and the swing meter-out pressure $P_{MOSwg}$, and controls the regulator 3*a* according to the pump target flow rate $Q_{TgtPmp}$. The controller 94 controls the actuator directional control valve 15 according to the target meter-in opening area $A_{TgtMIBm}$, and controls the swing directional control valve 14 according to the target meter-out opening area $A_{TgtMOSwg}$.

According to the present embodiment configured as above, at the time of combined operation to simultaneously drive the swing motor 211 and another actuator 204*a*, the boom 204 can be operated in accordance with the target speed by regulating the meter-in opening according to the differential pressure across the boom directional control valve 9, 10, or 15 and supplying the boom cylinder 204*a* with the same flow rate as the target. Furthermore, an overrun of the swing structure 202 due to the inertia, and so forth, can be prevented by regulating the meter-out opening of the swing directional control valve 14 and inputting the same torque as the target to the swing motor 211. Moreover, the pump target flow rate $Q_{TgtPmp}$ of the hydraulic pump 3 is equal to the sum of the boom target flow rate $Q_{TgtBm}$ and the swing target flow rate $Q_{TgtSwg}$, and the flow rate obtained by subtracting, from the delivery flow rate of the hydraulic pump 3, the flow rate of supply to the boom cylinder 204*a* is supplied to the swing motor 211. Thus, the swing structure 202 can be operated in accordance with the target speed. Due to this, with the simple configuration using the directional control valves that execute the meter-in opening control and the meter-out opening control by the same valve disc, at the time of combined operation to simultaneously drive the swing motor 211 and the other actuator 204*a*, speed control of the actuator 204*a* and torque control of the swing motor 211 can be executed.

Furthermore, the work machine 901 in the present embodiment includes the bleed-off valve 37 that discharges the hydraulic operating fluid delivered from the hydraulic pump 3 to the hydraulic operating fluid tank 5. The controller 94 calculates the bleed-off valve target opening area $A_{TgtBo}$ that is the target value of the opening area of the bleed-off valve 37 on the basis of the input amount of the operation devices 95*a* and 95*b*, and calculates the estimated bleed-off flow rate $Q_{EstBo}$ that is the estimated value of the passing flow rate of the bleed-off valve 37 on the basis of the bleed-off valve target opening area $A_{TgtBo}$ and the pump pressure $P_{Pmp3}$. The controller 94 calculates the sum of the actuator target flow rate $Q_{TgtBm}$, the swing target flow rate $Q_{TgtSwg}$, and the estimated bleed-off flow rate $Q_{EstBO}$ as the pump target flow rate $Q_{TgtPmp}$. Due to this, a surplus of the delivered fluid of the hydraulic pump 3 is discharged to the hydraulic operating fluid tank 5 at the start of operation of the actuator 204*a*. Thus, it becomes possible to prevent sudden action of the actuator 204*a*.

Although the embodiment of the present invention has been described in detail above, the present invention is not limited to the above-described embodiment and various modification examples are included therein. For example, the above-described embodiment examples are described in detail in order to explain the present invention in an easyto-understand manner and are not necessarily limited to that including all configurations described.

DESCRIPTION OF REFERENCE CHARACTERS

1: First hydraulic pump
1*a*: Flow rate control command pressure port (regulator)
2: Second hydraulic pump
2*a*: Flow rate control command pressure port (regulator)
3: Third hydraulic pump
3*a*: Flow rate control command pressure port (regulator)
5: Hydraulic operating fluid tank
6: Travelling-right directional control valve
7: Bucket directional control valve
8: Second arm directional control valve
9: First boom directional control valve (actuator directional control valve)
10: Second boom directional control valve (actuator directional control valve)
11: First arm directional control valve
12: First attachment directional control valve
13: Travelling-left directional control valve
14: Swing directional control valve
15: Third boom directional control valve (actuator directional control valve)
16: Second attachment directional control valve
17: Flow combining valve
18 to 20: Main relief valve
21 to 32: Check valve
35 to 37: Bleed-off valve
37*a*: Command pressure port
40: Pump line
41 to 48: Flow line
50: Pump line
51 to 58: Flow line
60: Pump line
61 to 66: flow line
70 to 73: Flow line
80, 81: Flow line
85: Pressure sensor (first pressure sensor)
86, 87: Pressure sensor (second pressure sensor)
88, 89: Pressure sensor (third pressure sensor)
91: Pilot pump
92: Pilot relief valve
93: Solenoid valve unit
93*a* to 93*f*: Solenoid valve
94: Controller
94*a*: Boom target flow rate computing section
94*b*: Swing target flow rate computing section
94*c*: Bleed-off valve target opening computing section
94*d*: Estimated bleed-off flow rate computing section
94*e*: Pump target flow rate computing section
94*f*: Pump control command output section
94*g*: Boom directional control valve target meter-in opening computing section
94*h*: Boom directional control valve control command output section
94*i*: Required torque computing section
94*j*: Gravitational torque computing section
94*k*: Inertial torque computing section
941: Target torque computing section
94*m*: Swing target meter-out pressure computing section
94*n*: Swing directional control valve target meter-out opening computing section
940: Swing directional control valve control command output section
94*p*: Bleed-off valve control command output section
95*a*: Boom operation lever (operation device)
95*b*: Swing operation lever (operation device)
201: Track structure
202: Swing structure
203: Work device
204: Boom
204*a*: Boom cylinder (actuator)
205: Arm
205*a*: Arm cylinder (actuator)
206: Bucket
206*a*: Bucket cylinder (actuator)
207: Cab
208: Machine chamber
209: Counterweight
210: Control valve
211: Swing motor (actuator)
212 to 216: Inertia measurement device (posture sensor)
901: Hydraulic excavator (work machine)
902: Hydraulic drive system

The invention claimed is:

1. A work machine comprising:
a track structure;
a swing structure swingably attached onto the track structure;
a work device attached to the swing structure;
a hydraulic operating fluid tank;
a hydraulic pump of a variable displacement type that sucks in a hydraulic operating fluid from the hydraulic operating fluid tank and delivers the hydraulic operating fluid;
a regulator that controls capacity of the hydraulic pump;
an actuator that drives the work device;
a swing motor that drives the swing structure;
an actuator directional control valve that controls flow of a hydraulic fluid supplied from the hydraulic pump to the actuator;
a swing directional control valve that controls flow of the hydraulic fluid supplied from the hydraulic pump to the swing motor;
operation devices to make an instruction of operation of the actuator and the swing motor; and
a controller that controls the regulator, the actuator directional control valve, and the swing directional control valve according to an input amount of the operation devices, wherein
the work machine includes
a first pressure sensor that senses a pump pressure that is a delivery pressure of the hydraulic pump,
second pressure sensors that sense an actuator meter-in pressure that is a pressure on a meter-in side of the actuator,
third pressure sensors that sense a swing meter-in pressure that is a pressure on a meter-in side of the swing motor and a swing meter-out pressure that is a pressure on a meter-out side of the swing motor, and
posture sensors that sense posture of the swing structure and the work device,
a meter-in opening and a meter-out opening are formed of a same valve disc in each of the actuator directional control valve and the swing directional control valve,
the actuator directional control valve is formed in such a manner that the meter-in opening becomes smaller than the meter-out opening with respect to valve displacement, the swing directional control valve is formed in such a manner that the meter-out opening becomes smaller than the meter-in opening with respect to valve displacement, and the controller is configured to calculate an actuator target flow rate that is a target value of a flow rate of the hydraulic fluid supplied from the hydraulic pump to the actuator on a basis of the input amount of the operation devices, calculate a swing target flow rate that is a target value of a flow rate of the hydraulic fluid supplied from the hydraulic pump to the swing motor on the basis of the input amount of the operation devices, calculate a pump target flow rate that is a target value of a delivery flow rate of the hydraulic pump on a basis of the actuator target flow rate and the swing target flow rate, calculate a target meter-in opening area that is a target value of a meter-in opening area of the actuator directional control valve on a basis of the actuator target flow rate, the pump pressure, and the actuator meter-in pressure, calculate target torque that is a target value of input torque to the swing motor on a basis of the input amount of the operation devices and output values of the posture sensors, calculate a swing target meter-out pressure that is a target of the swing meter-out pressure on a basis of the target torque and the swing meter-in pressure, calculate a target meter-out opening area that is a target value of a meter-out opening area of the swing directional control valve on a basis of the swing target meter-out pressure and the swing meter-out pressure, control the regulator according to the pump target flow rate, control the actuator directional control valve according to the target meter-in opening area, and control the swing directional control valve according to the target meter-out opening area.

2. The work machine according to claim 1, wherein the work machine includes a bleed-off valve that discharges the hydraulic operating fluid delivered from the hydraulic pump to the hydraulic operating fluid tank, and the controller is configured to calculate a bleed-off valve target opening area that is a target value of an opening area of the bleed-off valve on the basis of the input amount of the operation devices, calculate an estimated bleed-off flow rate that is an estimated value of a passing flow rate of the bleed-off valve on the basis of the bleed-off valve target opening area and the pump pressure, and calculate a sum of the actuator target flow rate, the swing target flow rate, and the estimated bleed-off flow rate as the pump target flow rate.

* * * * *